G. E. Clow,
Attaching Hubs to Axles.
No. 107,452.   Patented Sep. 20 1870

Witnesses:
Victor Hagmann
Chas. A. Pettit

Inventor:
G. E. Clow
per Munn & Co.
Attorneys.

United States Patent Office.

GEORGE E. CLOW, OF JEFFERSONVILLE, INDIANA.

Letters Patent No. 107,452, dated September 20, 1870.

IMPROVEMENT IN SECURING HUBS TO AXLES.

The Schedule referred to in these Letters Patent and making part of the same.

*To all whom it may concern:*

Be it known that I, GEORGE E. CLOW, of Jeffersonville, in the county of Clark and State of Indiana, have invented a new and improved Device for Securing Hubs to Axles; and I do hereby declare that the following is a full, clear, and exact description of the same, reference being had to the accompanying drawing forming a part of this specification, in which—

Figure 1:
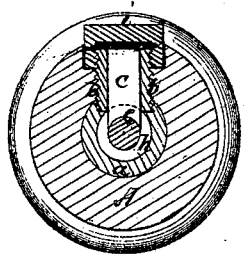
Figure 2:
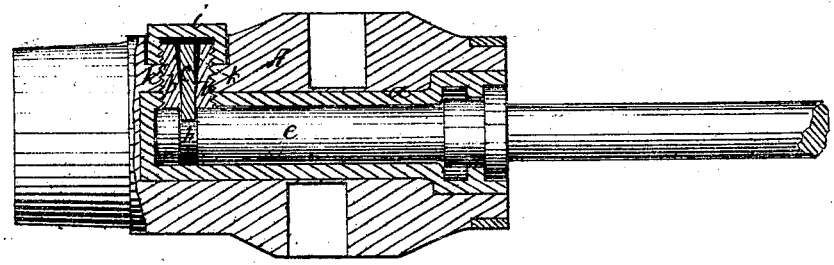

Figure 1 is a cross-section, and
Figure 2 a longitudinal section.

Hitherto the means or devices for securing hubs to axle-journals, and the oil-tubes connected therewith, have been separately applied. Hence, two or more radial perforations were required in the hub, with corresponding fittings, involving labor and expense, and weakening the hub, in addition to being otherwise objectionable.

My invention has for its main object the removal of these objections, and consists in the combination, with the hub and axle-journal box, of a channeled or grooved oil-tube and a fastening key, so arranged that the said box is secured in the hub by the tube, which is screwed in for that purpose, and the key not only closes the oil-passages, when fully inserted, but also prevents the axle being withdrawn.

In the drawing—
A is the hub;
a, the axle-box;
b, the tube;
c, the key;
e, the axle;
h, the circumferential groove in the axle; and
i, the cap which covers the tube.

The key is oblong in cross-section, tapering lengthwise, and concave at the end which is next the axle.

There are recesses, k, in the tube not filled by the key, into which oil may be poured. The recesses do not extend to the bottom of the tube, and the orifice in which the key is placed is entirely closed by the latter at its inner end, so as to prevent the escape of the oil, except when the key is removed, which may be done, and the axle thus lubricated without removing the wheel.

The cap i is furnished with a rubber packing, which tightly closes the tube when the cap is screwed down. The tube also serves to secure the axle-box in the hub. No packing is required to keep the wheel in its proper position.

It will be observed that the key requires to be only partly withdrawn from the tube in order to admit the oil, a small quantity of which may be retained in the chamber k for use on another or the next occasion.

By this arrangement I provide a simple, cheap, secure, and convenient fastening for the journal-box, as well as the axle, and avoid perforating the hub more than once. Axle-journals and hubs of the ordinary kind may be easily converted to be secured together by the means described.

Having thus described my invention,
What I claim as new, and desire to secure by Letters Patent, is—

1. The tube b, provided with the channels or grooves k, and screwed through the hub A and into the journal-box a, as and for the purpose shown and described.

2. The axle-journal e, box a, and hub A, secured together by the screw-threaded oil-tube b and key c, all constructed and arranged as shown and described, for the purpose specified.

GEO. E. CLOW.

Witnesses:
S. S. JOHNSON,
J. G. BRIGGS.

*Assignor to himself & Benjamin Clow of Chicago, Illinois.*